No. 724,596. PATENTED APR. 7, 1903.
W. MATOUCH.
MOSS HARROW.
APPLICATION FILED JULY 13, 1901.
NO MODEL. 2 SHEETS—SHEET 1.
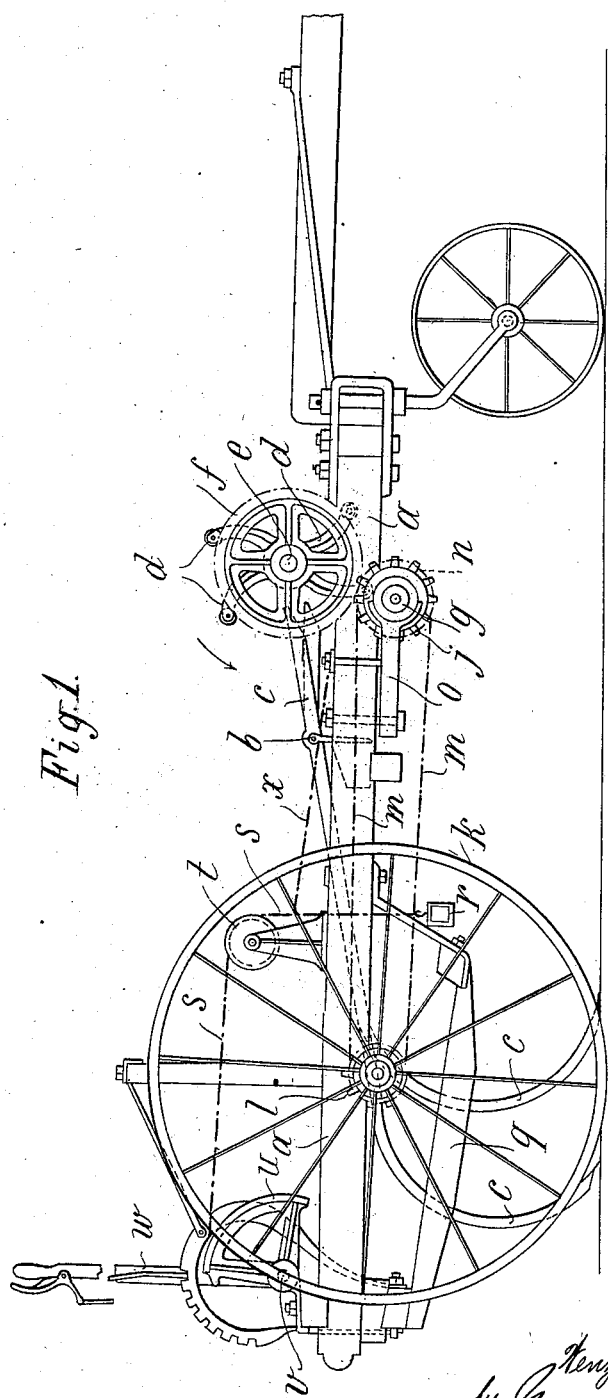

No. 724,596. PATENTED APR. 7, 1903.
W. MATOUCH.
MOSS HARROW.
APPLICATION FILED JULY 13, 1901.
NO MODEL. 2 SHEETS—SHEET 2.
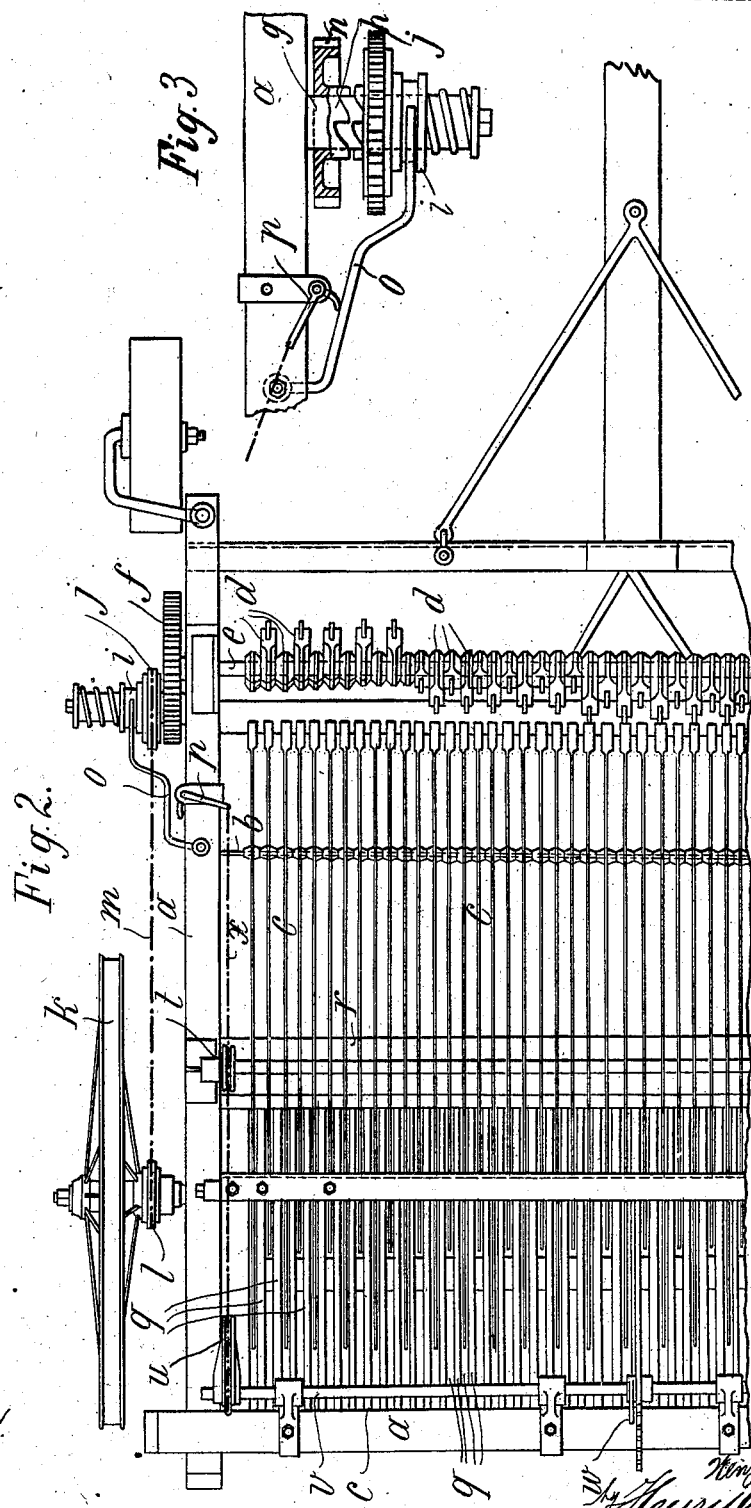

UNITED STATES PATENT OFFICE.

WENZEL MATOUCH, OF PILICA, RUSSIA.

MOSS-HARROW.

SPECIFICATION forming part of Letters Patent No. 724,596, dated April 7, 1903.

Application filed July 13, 1901. Serial No. 68,186. (No model.)

*To all whom it may concern:*

Be it known that I, WENZEL MATOUCH, a subject of the Emperor of Austria-Hungary, residing at Pilica, in the Province of Russian Poland, in the Empire of Russia, have invented certain new and useful Improvements in Moss-Harrows; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The subject of this invention is a harrow for removing moss from turf on meadows and elsewhere, in which harrow there is a continual cleansing of the tools in use during the work.

My improved moss-harrow has a number of bars movable about a horizontal axis. The ends of these bars, which extend downward and come into engagement with the ground, are made sickle or hook shaped and are provided with a sharp edge or point. These bars are alternately raised and allowed to fall by cams on a rotating shaft, whereby they penetrate at their points into the uppermost layer of the ground and detach or remove the moss therefrom. The scraping off from the bars of the moss and other parts of plants, earth, and the like torn loose for the purpose of cleaning the said bars is effected during the work by a stationary rake or grating, in the spaces or slits of which the bars move up and down.

In the accompanying drawings, Figure 1 shows a moss-harrow of this kind in side elevation. Fig. 2 shows a part of the harrow in plan. Fig. 3 shows the arrangement for throwing the driving-chain or sprocket-wheel into and out of gear.

The harrow consists of a rectangular frame $a$, of wood or iron, which is mounted on four or, if desired, on three running-wheels. On the horizontal axis $b$ are pivotally mounted a number of iron or steel bars $c$, some of which are short and others long. These bars are made sickle or hook shaped at their downwardly-turned rear ends and are provided with a knife-like edge or a point in the form of a thorn. Each of these bars can be made in one or more pieces. In the latter case the sickle or hook shaped part of the bars can be detachably connected to the straight part. On the thickened or broadened front ends of the bars $c$ act arms $d$ on a cam-shaft $e$, the said arms being provided with rollers at their ends. The shaft $e$ bears a gear-wheel $f$ at each end, in which gear-wheel engages a gear-wheel $n$, loosely mounted on a stud-shaft $g$. Each of these wheels can be connected by means of a claw-clutch $h$ $i$, Fig. 3, to a chain-wheel $j$, which is driven from the rear running-wheel $k$ by means of a chain-wheel $l$ and a chain $m$.

In order to throw the clutch members $h$ $i$ into and out of gear, I employ a lever $o$, which is mounted on the frame $a$ and engages with the clutch-sleeve $i$ and a corresponding bell-crank lever $p$, which is mounted on the frame $a$ and according to its position displaces the lever $o$, and thus effects the throwing into or out of gear of the coupling member $i$, which is acted upon by a spring.

The arms $d$ lift in their rotation the rearward ends of the bars $c$ and allow them to fall again on release. Preferably longer and shorter bars $c$ are arranged alternately next to each other, and the arms $d$, which are secured to the shaft $e$ by set-screws, are so adjusted that the shorter bars are always raised first and the longer bars afterward. The scraping or cleaning of the bars is effected by a wood or iron rake or grating $q$, which also serves as a guide for the bars. The said bars move in the spaces or slits of the rake or grating which scrapes off from the bars the torn-up adhering moss and other matter detached by the bars. In order to raise or throw the bars out of action, an unshipping-bar $r$ is employed. This bar is suspended on both sides on chains $s$, which are guided over rollers $t$ to the eccentrics $u$. The said eccentrics are secured to a shaft $v$, which bears a hand-lever $w$, capable of being secured by means of a pawl to a toothed arc. The bell-crank levers $p$ are connected by chains $x$ with the chains $s$ of the unshipping-bar. When the lever $w$ is moved backward, the bars $c$ are raised by the unshipping-bar $r$, and the clutch members $h$ $i$ are simultaneously thrown out of gear, so that the shaft $e$ ceases to turn.

I claim—

1. In a harrow, a suitable frame, a revoluble axle at one end thereof and wheels secured to said axle, a series of bars alternately long and short, each enlarged at one end, harrow-teeth on the opposite end of each bar, a rod on which all of said bars are pivoted, a cam-shaft driven from the revoluble axle, a series of cams on said shaft, each arranged to engage the enlarged end of a bar and scrapers below the frame on each side of a tooth arranged to remove adhering material when a tooth is lifted, substantially as described.

2. In a harrow, a suitable frame, a revoluble axle at one end thereof and wheels secured to said axle, a series of bars alternately long and short, each flattened at one end and alined, a harrow-tooth on the other end of each bar making but a small angle to the surface of the ground, a rod on which all of said bars are pivoted, a cam-shaft, a clutch member driven from the revoluble axle, a complementary member carrying a pinion, said pinion arranged to drive the cam-shaft, a series of cams on said shaft, each engaging the flattened end of a bar and timed to lift the shorter bars before the longer ones, and independent hand-operated means to simultaneously lift all of the harrow-teeth and disengage the clutch members, substantially as described.

In testimony that I claim the foregoing as my invention I have signed my name in presence of two subscribing witnesses.

WENZEL MATOUCH.

Witnesses:
JOSEF RUBRESCH,
ALVESTO S. HOGUE.